United States Patent [19]
Kneidinger et al.

[11] Patent Number: 5,107,361
[45] Date of Patent: Apr. 21, 1992

[54] OPTICAL SUBSCRIBER NETWORK

[75] Inventors: Max Kneidinger; Helmut Strasser; Johann Wolfgang, all of Vienna, Austria

[73] Assignee: Alcatel N.V., Amsterdam, Netherlands

[21] Appl. No.: 602,469

[22] Filed: Oct. 24, 1990

[30] Foreign Application Priority Data

Oct. 24, 1989 [AT] Austria ................................. 2446/89

[51] Int. Cl.⁵ ............................................. H04J 14/08
[52] U.S. Cl. ................................... 359/135; 359/137; 370/94.3
[58] Field of Search ............... 370/4, 94.3, 95.1, 95.3; 359/135, 137, 139, 118

[56] References Cited

U.S. PATENT DOCUMENTS

| | | | |
|---|---|---|---|
| 4,726,010 | 2/1988 | Ali et al. | 370/4 |
| 4,809,362 | 2/1989 | Claus et al. | 370/94.3 |
| 5,008,883 | 4/1991 | Eizenhöfer et al. | 370/95.1 |

FOREIGN PATENT DOCUMENTS 8805233  7/1988  World Int. Prop. O. .............. 370/4

Primary Examiner—Edward L. Coles, Sr.
Assistant Examiner—Kinfe-Michael Negash
Attorney, Agent, or Firm—Ware, Fressola, Van Der Sluys & Adolphson

[57] ABSTRACT

A method is used for transmitting binary information in successive time slots of a time division multiplex frame format in an optical transmission network with a number of terminals and a central unit. At least one optical fiber is connected to the central unit and spreads to the terminals in a tree-like structure via one or more beam splitters and further optical fibers. An address is allocated to each terminal, and synchronization is performed for the transmitting operation of the terminal being phase-locked to the central unit in dependence of the signal delay time between the terminal and central unit. The transmitting level of the terminal is adjusted in dependence upon the line attenuation between terminal and central unit. The frame format has a number of time slots for line-switched information, as well as a number of bits for control and synchronization purposes.

23 Claims, 1 Drawing Sheet

OPTICAL SUBSCRIBER NETWORK

BACKGROUND OF THE INVENTION

The invention relates to an optical transmission network and a method for transmitting binary information in successive time slots of a time division multiplex frame format in the optical transmission network which has a number of terminals and a central unit. At least one optical fibre is connected to the central unit and spreads to the terminals in a tree-like structure via at least one beam splitter and further optical fibres. An address is allocated to each terminal. Synchronization of the terminals is accomplished by phase-locking the terminal to the central unit in dependence upon the signal delay time between the terminal and the central unit. The transmitting level of the terminal is adjusted in dependence upon the line attenuation between the terminal and the central unit. The frame format has a number of time slots for line-switched information as well as a number of bits for control and synchronization purposes.

Optical transmission networks have been described in EP-A-0 318 331. It is well-known to use beam splitters in such optical transmission networks in order to attain a tree-like structure and thus to ensure that each subscriber connected to the network can start communication via the central unit or can be integrated into communication by the central unit. Such a tree-like structure clearly defines the transmission time being required for the path between the subscriber and the central unit, which is a fundamental requirement for the synchronization of transmission. Beam splitters or optical splitters represent an attenuator in both directions of transmission within such a network, which makes the level arriving via the transmission path dependent on the length of the path and the number of beam splitters.

In such optical transmission networks, time multiplex transmission in time slots is standard, whereby each terminal usually is organized to have a time slot of its own within which communication between the terminal and the central unit can occur. Moreover, transmission usually is organized to provide—apart from the respective time slots—a number of bits for packet-oriented communication as well as a number of bits for internal control and synchronization purposes. The packet section of the frame is usually triggered by a main unit- or central unit- command. Thus, the optical fibre network is designed as a passive network, and within the transmission path, apart from optical fibres and passive beam splitters, no further equipment is provided to modify the transmission path.

In order to assign to each terminal an adequate time window within the time multiplex frame format, usually a switching-on and configuration procedure has to be preformed to be able to integrate all terminals being activated into the transmission network. The optical transmission network already known from EP-A-0 318 331 has such a switching-on and configuration procedure triggered centrally; and, depending on the distance to the terminal, for each terminal to be newly installed one or two frames are used for signal delay time measuring purposes. For the adjustments of the terminal, each frame has a first section as a "housekeeping" channel. Subsequently, each active terminal has to have an address which enables it to be addressed by the central unit directly and unconfusingly, and a time slot will have to be assigned thereto on which it is able to send and receive its line-switched information in each frame. Making the address and time slot number identical is useful.

An active terminal, which is a terminal integrated into the network, will have to know the signal delay time between the terminal and the central unit. The delay time resulting from the signal delay is the time which has to pass between the start of the received frame coming from the central unit and the start of the terminal's own transmitting to enable its own transmission signal to insert itself into the appropriate time slot of the frame.

Naturally, signals can only be received if the line attenuation allows signal detectability. Therefore, it will be necessary to adapt the transmitting level of a terminal to the given line attenuation in a manner which enables unmistakable signal identification and processing in comprehensive optical networks. In order to assure the reliability of signal intelligibility throughout the whole network, it will be advantageous if the transmitting level is adjusted so that the level received by the central unit is equal for all terminals.

In a well-known embodiment of the optical transmission network, the switching-on and configuration procedure is initiated by the central unit. This means that the central unit has to check—throughout the whole network—the possibility of connecting a further terminal in regular time intervals. The central checking procedure and the information about the values to be adjusted by the terminals must be performed via the "housekeeping" channel much more often than new terminals are to be connected. If such a partial blockage of the central unit for unnecessary sampling of information via the "housekeeping" channel is to be avoided, it would be required that new terminals only be connected at certain times. Thus, the well-known configuration could not do without the "housekeeping" channel.

In larger networks in particular, it will not be easily possible to connect extensions at random instants if manual intervention in the transmission processing is to be avoided. In addition, a terminal, when being switched on due to a switching-on and configuration procedure from the central unit, will have to be able to transmit a given address, which is a hardware feature of the respective terminal. Therefore, this given address will have to be made known to the central unit because, if following the conventional procedure, a switching-on and configuration procedure will not be successful without the address. Under no circumstances may this given address be assigned several times by the producers of terminals, which results in producers, high expenditure for administration and assignment of addresses, and, usually, in relatively long addresses for safety reasons. Thus, given addresses have to be made available for the central unit to initiate a switching-on and configuration procedure after such manual handling.

SUMMARY OF THE INVENTION

The invention is aiming at integrating terminals at random instants into an optical transmission network without the knowledge of a predetermined address being necessary. Furthermore, the invention is aiming at automatically simplifying installation and maintaining the most favourable conditions of communication at a given time.

To solve this task, the method according to the invention particularly provides that the frame format has a number of bits for packet-oriented communication. This packet section of the frame is cleared by a command sent by the central unit to all active terminals to allow a switching on and configuration procedure to be performed in a ranging window for terminals to be newly installed, initiated or controlled. A newly-connected terminal, which is not yet active and to which an address and time slot have not yet been assigned, produces a station key word consisting of a predetermined number of bits as a random value in the ranging window. The station key word is sent to the central unit which retransmits the received bit pattern to the terminals. The received bit pattern is compared with the bit pattern of the transmitted station key word in the newly-connected terminals.

Because the bits used for packet-oriented communication within the frame format is cleared as ranging windows, a possibility is created to perform the switching-on and configuration procedure from the actual newly-connected terminal. With such a switching-on and configuration procedure having been performed by the terminal, it is no longer necessary to transmit any address information to the central unit before the switching-on procedure is started. On the contrary, the address is agreed on between terminal and central unit during the switching-on and configuration procedure; and in the course of the switching-on and configuration, a time slot of the time multiplex frame format is agreed on as an essential characteristic for the new terminal. The actual time slot can be the address itself or, independent of a freely chosen or random address, is available for further transmission. Such a switching-on and configuration procedure performed by the terminal allows terminals to be displaced from one physical location to another one in a simple manner in larger networks, such that the required measures can be controlled automatically without manual intervention at the terminal.

First of all, a newly-connected but not yet active terminal only has to recognize that the ranging window is available, thereafter the terminal transmits a station key word. The key word may consist of a number of bits, e.g. 16, and be generated in the terminal as a random value at the beginning of the procedure. Such a station key word is received and immediately retransmitted by the central unit if the ranging window is cleared. A fault-free retransmission indicates that no other terminal tried concurrently to initiated a switching-on and configuration procedure and that the transmitting level was sufficient for fault-free recognition by the central unit.

If the bit pattern transmitted by the central unit is unrecognizable and the identity cannot be determined, the reason may be that, due to the actual transmission path, the selected transmitting level of the newly connected terminal is too low. Preferably, the procedure in that case will be that the transmission of the station key word is performed by the newly-connected terminal successively with different transmitting levels in order to detect a minimum transmitting level and, if necessary, a maximum transmitting level. For a future transmitting level, a value between the detected extreme values is adjusted in the terminal. The same procedure may also be performed cyclically for the optimization of the conditions of transmission, even if the first communication was successful.

On retransmission of an invalidated bit pattern by the central unit, it is also possible that a further terminal concurrently tried to start a switching-on and configuration procedure. In order to avoid such errors, the method according to the invention advantageously is applied in such a was that on retransmission of an invalidated bit pattern by the central unit, the terminal(s) which tries (try) to perform the connection make(s) a pause, the duration of which has a random value produced in the terminal and lying within a predetermined range and/or increases with an increasing number of unsuccessful trials. Preferably, after a predetermined number of unsuccessful trials the transmitting level of the terminal is increased to the value next in order. As soon as the terminal receives its original key word, there is, obviously, no collision, and the adjusted transmitting power of the terminal obviously is correct as well.

After the adjusting of transmitting power has been optimized in the above manner, the time delay existing between the transmitting of the key word and the receiving of the key word must be detected. In the newly-connected terminal which is exclusively using the ranging window and is operating at the optimized transmitting level, the signal delay time on the optical transmission line is detected. The signal delay time is determined from the time delay between the transmitting of the station key word by the terminal and the receiving of the station key word at the terminal, said station key word having been retransmitted by the central unit. From the signal delay time the required setting of the time delay of the terminal's own transmitter is derived. After the required adjustment using the time delay and synchronization with the time base of the central unit, terminal transmission will always arrive in the time slot provided for in the time multiplex frame format.

It will be useful for the permanent integration of a newly-connected terminal into the optical transmission system to apply the method in a way that on detecting whether the bit pattern being retransmitted by the central unit and the one transmitted by the newly-connected terminal are identical in the terminal, this terminal then detects a free time slot, preferably the next free time slot, and seizes this time slot by the feeding in of another bit pattern, identifying it as being assigned in the transmitting direction towards the central unit. Thus, on detection of the identity of the bit pattern retransmitted by the central unit with the transmitted bit pattern of the newly-connected terminal, a free time slot can be assigned in the frame format, whereby preferably the next free time slot of the frame format will be used. This free time slot will now be seized in the transmitting direction towards the central unit by the feeding in of another bit pattern signifying the seized state.

In order to offer the possibility of continual optimization of transmitting conditions within the total optical transmission network, it will be of advantage if the packet channel used as a ranging window is cleared by the central unit at regular intervals. Thereby, for optimization purposes, a check request for the parameters having been determined in a decentralized manner will be triggered by the central unit at regular time intervals, whereby the procedure—in order to make possible the follow-up of the transmission parameter—will be that the central unit each time requests another terminal in regular time intervals, e.g. every hour, to optimize the transmitting level and to perform the detection of time delay again, while all other terminals have to keep the packet channel clear. This clearing of the packet channel is called the adjustment window.

After the switching-on and configuration procedure has been performed, and in particular after the appropriate transmitting level has been determined and the assigned time slot has been seized, this seizure is acknowledged by the central unit. The seizure of the time slot is performed, as described above, by filing a bit pattern, e.g. a control bit assigned to the time slot, which can define the time slot to be seized or idle, so that the central unit registers the seizure and acknowledges it by appropriately changing the bit pattern in the direction of transmission towards the terminal. As already mentioned above, by selecting a certain time slot the station address can be defined in an advantageous manner, and within the time multiplex format the terminal can be addressed directly by the central unit on the channels provided for internal communication. As soon as the central unit recognizes that the configuration phase triggered by the terminal has been finished, the packet channel is again opened for all stations by an appropriate command, whereby the ranging window is closed.

As already mentioned above, by the decentralized switching-on and configuration procedure, the allocation of a terminal-specific address is avoided, thus no manual modifications are necessary for the switching-on and configuration procedure. The configuration procedure performed by the terminal which is made possible because the central unit only clears one ranging window, may subsequently, in the same manner, enable a decentralized follow-up of the transmission parameters which can be performed automatically as well. Due to the slow change of parameters, e.g. temperature drifting, etc., the transmission parameters may experience minor changes, and the decentralized follow-up allows the system to counteract possible transmission troubles.

An optical fiber network with a common transmitting/receiving fibre will be sufficient for the above described procedure. Alternatively, the selected procedure naturally can be applied in optical fibre networks designed each with a transmitting and receiving fibre. In such an embodiment, there are two equal tree structures of optical fibres and passive directional couplers. On the one network, the information from the central unit to the terminals and on the other network the information from the terminals to the central unit will be transmitted. The main advantage of the method according to the invention is, above all, that it can be applied without any disturbances of the networks, with a simple structure comprising only one optical fibre for the transmitting and receiving directions as well. In such an optical fibre network, a time division multiplex procedure will be applied for the transmission. A modified frame multiplex format is used which is divided into one part containing the information transmitted by the central unit, and into another part containing the information transmitted by all terminals.

In such a one-fibre network structure, the two information parts are separated from each other by a protection time which advantageously corresponds at least to the double signal delay time from the central unit to the terminal which represents the geographically farthest distance to the central unit.

The optical transmission network for the application of the method according to the invention shows a number of terminals and one central unit. At least one optical fibre is connected to the central unit and spreads to the terminals in a tree-like structure via at least one beam splitter and further optical fibres. Each terminal is equipped with a transmitter and a receiver for optical binary signals, and the transmitting level of the terminals is adjustable. For the performance of a decentralized switching-on and configuration procedure, each terminal contains a random generator for creating a station key word which has to be sent to the central unit during a configuration phase, and a comparator for comparing the bit pattern of the station key word which has been transmitted form the terminal to the central unit and retransmitted therefrom with the transmitted station key word. A logic circuit, on receiving an invalidated station key word, causes a repetition of the trial. In the terminal, a time measuring device is provided for the measuring of the time delay between the transmitting of the station key word and the receiving of the station key word retransmitted by the central unit and for the adjustment of the time delay of the terminal's own transmitter. The decentralized terminals are equipped with a random generator to make it possible to create the station key word which is required for the decentralized switching-on and configuration procedure. The terminals are able to perform the comparing between the transmitted key word and the key word being retransmitted by the central unit. The switching-on and configuration procedure is made feasible by the terminal without any further predetermined information from the central unit. Finally, the time measuring device provided for in the terminal offers the possibility to adjust the transmitting moment by the terminal in such a manner that the time slot having been defined in the course of the switching-on and configuration procedure is really used.

Advantageously, the transmission network according to the invention is developed in such a manner that in the terminal a delay device preferably containing a random generator for the adjusting of time intervals between successive switching-on trials is provided, which guarantees that even if switching-on trials are invalidated due to a concurrent switching-on of a majority of terminals, a fault-free switching-on procedure can be performed.

DESCRIPTION OF THE DRAWINGS

The invention will be explained in detail by means of the example of an embodiment which is depicted schematically in the drawings, which show.

DETAILED DESCRIPTION OF THE PREFERRED EMBODIMENT

Figure 1:
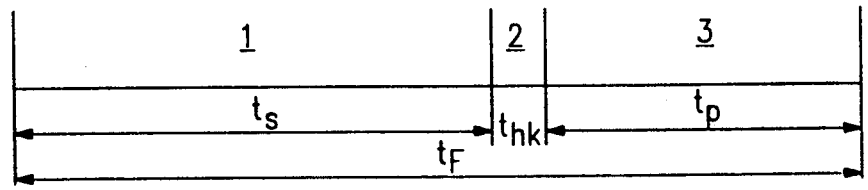
FIG. 1 is a time multiplex frame format suited for the transmission method according to the invention.

In FIG. 1, a time multiplex frame format is shown which comprises a first section 1 being assigned to the terminals of an optical transmission network and divided into timeslots, a "housekeeping" section 2, and a packet section 3. These sections have a duration of ts, thk and tp, respectively. The total duration of the frame is tF, and this duration may be 125 microseconds in a practical case. Section 1 starts with a synchronization signal pattern and contained adjoined thereto a number of time slots of 8 bits each, which number corresponds to the maximum number of terminals being connectable to a central unit. According to the number of really connected active terminals, a corresponding number of time slots in seized, while the remaining time slots will remain unused. 8-bit time slots can be utilized for the transmission of telephone conversations.

Housekeeping section 2 is used for the transmission of operating data and operating parameters.

Packet section 3 is used for packet-wise data transmission, e.g. text and graphics.

If for both directions of transmission one single optical fibre is used, a superframe has to be provided, which successively comprises one frame each for the transmitting direction from the central unit to the terminals, and one frame for the transmitting direction from the terminals to the central unit. Those two frames are separated by a protection time which is at least corresponding to the doubled value of the longest signal delay time between a terminal and the central unit.

Figure 2:
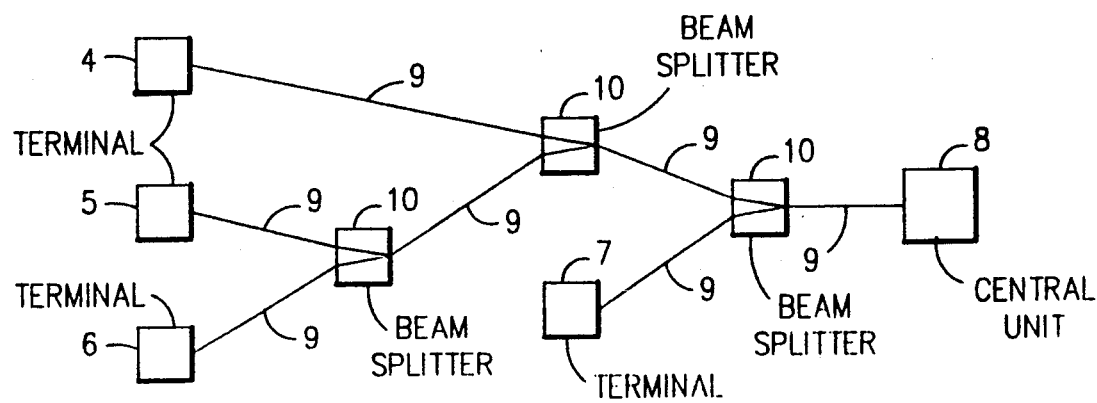
FIG. 2 is an optical transmission network for the application of the method according to the invention, represented schematically.

FIG. 2 schematically shows an optical transmission network with a tree-like structure, whereby one optical fibre each is used for signal transmission in both directions. The transmission of information between the terminals 4, 5, 6 and 7 on the one hand and a central unit 8 on the other hand is performed by optical fibres 9 and beam splitters 10. There is a clear path with constant length and a signal delay time corresponding to this length for each connection. Thus, the signal delay times between the central unit and the individual terminals are generally different and have to be considered for keeping the frame format if a terminal is integrated into the optical transmission network. Furthermore, when transmission is performed, the signal attenuation has to be considered, which is depending not only on the length of the line, but also on the number of beam splitters to be passed by the signal. Furthermore it has to be considered that signal attenuation in the beam splitters not only may occur from the central unit to a terminal, but also from a terminal to the central unit.

Figure 3:
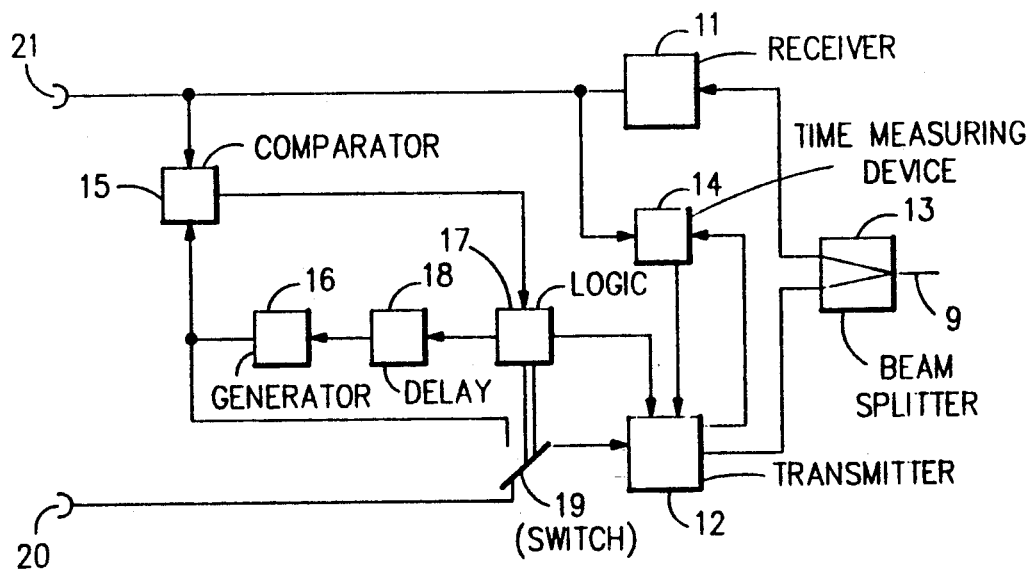
FIG. 3 is a block diagram of a terminal for the transmission network according to FIG. 2.

A block diagram with the essential components of a terminal is depicted in FIG. 3. The terminal has a receiver 11 and a transmitter 12, as well as a beam splitter 13 for the transmission of information via a one-fibre transmission network. Alternatively, for using successive frames for the two directions of transmission, duplex traffic with differing light wavelengths for the two directions of transmission can be performed via one single optical fibre, in which case beam splitter 13 would have to be equipped with appropriate transmission filters for the two wavelengths or carrier frequencies, respectively, for the generation of a frequency-selective filter. For the consideration of the signal delay time between terminal and central unit, a time measuring device 14 is provided for adjusting an appropriate time delay in transmitter 12 with respect to the synchronizing signal being provided by the central unit for all terminals, so that transmissions of the terminal are positioned correctly in the time slot which is assigned to the terminal. A comparator 15 is provided for the correct detection and the securing of fault-free communication of a terminal newly connected to the optical transmission network, which comparator checks the compliance of a reply arriving from the central unit with a station key word having been transmitted by the terminal. Such a station key word is generated on request by a random generator 16. Random generator 16 may be triggered by a logic circuit 17 via a delay circuit 18. Logic circuit 17 can, moreover, influence the transmission level of transmitter 12 and actuate a changeover switch 19, which either conducts a signal to be transmitted for the switching-on and configuration procedure from random generator 16 or, for the normal transmission of information, from input 20 to transmitter 12. Information having been received by the central unit is available at output 21. The output and input of the terminal towards the network are connected to a single optical fibre 9.

Packet section 3 of the frame depicted in FIG. 1 is cleared periodically, e.g. every 10 seconds, by the central unit, and by a command transmitted to all active terminals, those terminals which have been newly connected are requested to perform a switching-on and configuration procedure. A newly-connected terminal which has not yet been activated and to which an address and time slot have not been assigned can report back in the packet section temporarily acting as a ranging window. For this purpose, the position of changeover switch 19 is changed from one depicted in FIG. 3 into the other one, and a random generator 16 generates a station key word consisting of a predetermined number of bits, which is transmitted via transmitter 12 to the central unit 8 (FIG. 2), and the central unit sends the received bit pattern back to the terminals 4, 5, 6, 7. In the newly-connected terminal, this bit pattern arrives at receiver 11 from optical fibre 9 via beam splitter 13; at receiver 11, the received optical signal is transformed into an electrical signal. In comparator 15 the received bit pattern is compared with the bit pattern having been generated by random generator 16, and the result of this comparison is sent to logic switch 17. Logic switch 17 decides whether the trial will have to be repeated after a time period caused by delay circuit 18 or not. On detecting the identity of the retransmitted bit pattern with the transmitted bit pattern, the newly-connected terminal detects a free time slot and seizes it by feeding in another bit pattern, which identifies this time slot to be assigned, in the direction of transmission to the central unit.

For the optimization of the transmitting level it will, however, be useful to perform the transmission of the station key word from the newly-connected terminal successively with stepwise increasing transmitting levels for detecting a minimum and eventually a maximum transmitting level as well, and the central unit will retransmit an invalidated bit pattern if the transmitting level is falling below or exceeding the minimum or maximum value, respectively. Now, caused by logic circuit 17 in transmitter 12, a value between the detected extreme values can be adjusted in the terminal for the transmitting level to be held in the future.

The retransmission of an invalidated bit pattern by the central unit can be caused by an inadequate transmitting level of the terminal, but it may also be caused by two or more newly-connected terminals having reported back concurrently with differing station key words. In order to be able to manage this last-mentioned case without any problems, it will be useful if the delay time of the delay circuit 18 is set at random within a predetermined range. Now it will be well possible that in case of the newly-connected terminals repeating their switching-on trials, they will report back at different times and not concurrently, transmitting their station key words, which will enable the proper activation of each single new terminals.

We claim:

1. A method for switching on and configuring a newly connected terminal in an optical transmission network having a number of terminals and a central unit connected by optical fibres and at least one beam splitter connected in a tree-like structure, wherein an address is allocated to each terminal, synchronization for terminal transmission is achieved by phase locking a terminal transmitter to the central unit in dependence upon a signal delay time between the terminal and the central unit, the transmitting level of the terminal is adjusted in dependence upon the line attenuation between the terminal and the central unit, and the network uses a time division multiplex frame format having a number of time slots forming a line-switched information section, a number of bits for a control and synchronization section, and a number of bits for a packet-oriented communication section, said method comprising the steps of:

clearing the packet section of the frame to form a ranging window by a command sent by the central unit to all active terminals to perform a switching-on and configuration procedure for newly connected terminals;

providing in the ranging window and transmitting to the central unit a station key word consisting of a predetermined number of bits as a random value, said station key word being generated by a newly connected terminal in response to the command;

retransmitting from the central unit the station key word to the terminals; and comparing in the newly connected terminal the received station key word with the transmitted station key word to determine if a valid station key word has been received.

2. A method according to claim 1, wherein upon detecting a valid station key word received from the central unit the terminal performs the following steps:

detecting a free time slot; and seizing the detected time slot by feeding into the time slot in the transmitting direction towards the central unit a bit pattern, identifying the time slot as being assigned.

3. A method according to claim 2, wherein the packet section is cleared by the central unit at regular intervals to form a ranging window.

4. A method according to claim 1, wherein the packet section is cleared by the central unit at regular intervals to form a ranging window.

5. A method according to claim 1, wherein the transmission of the station key word is performed successively by the newly connected terminal at different transmitting levels in order to determine a transmitting level at which a valid station key word is detected.

6. A method according to claim 5, wherein minimum and maximum transmitting levels are determined, whereby an optimized transmitting level can be used for future transmissions.

7. A method according to claim 5, wherein upon detecting a valid station key word received from the central unit the terminal performs the following steps:

detecting a free time slot; and seizing the detected time slot by feeding into the time slot in the transmitting direction towards the central unit a bit pattern, identifying the time slot as being assigned.

8. A method according to claim 5, wherein the packet section is cleared by the central unit at regular intervals to form a ranging window.

9. A method according to claim 5, wherein upon retransmission of an invalid station key word by the central unit, the terminal trying to perform the procedure makes a pause, the duration of which has a random value produced in the terminal and lying within a predetermined range, after which the terminal again transmits the station key word.

10. A method according to claim 1, wherein a newly connected terminal which has detected a valid station key word, is switched on and is using a ranging window and is operating at an optimized transmitting level, performs the additional steps of:

detecting a signal delay time on the optical transmission line from the time between the transmitting of the station key word and the receiving of the station key word; and setting a time delay for its own transmitter based upon the detected signal delay time.

11. A method according to claim 10, additionally comprising the steps of:

periodically clearing the packet section of the frame to form an adjustment window by a command from the central unit to all active terminals, said command also directing a particular active terminal to perform an adjustment procedure; and optimizing the transmitting level and the time delay of the particular active terminal using an adjustment procedure during the adjustment window for adjusting the transmission level and the time delay in a manner similar to that used to initially set the level and delay.

12. A method according to claim 1, wherein upon retransmission of an invalid station key word by the central unit, the terminal trying to perform the procedure makes a pause, the duration of which has a random value produced in the terminal and lying within a predetermined range, after which the terminal again transmits the station key word.

13. A method as described in claim 12, wherein after a predetermined number of unsuccessful trials, the transmitting level of the terminal is increased to a next level.

14. A method according to claim 12, wherein upon detecting a valid station key word received from the central unit the terminal performs the following steps:

detecting a free time slot; and seizing the detected time slot by feeding into the time slot in the transmitting direction towards the central unit a bit pattern, identifying the time slot as being assigned.

15. A method according to claim 12, wherein the packet section is cleared by the central unit at regular intervals to form a ranging window.

16. A method according to claim 1, wherein upon retransmission of an invalid station key word by the central unit, the terminal trying to perform the procedure makes a pause, the duration of which increases with the increasing number of unsuccessful trials, after which the terminal again transmits the station key word.

17. A method according to claim 16, wherein after a predetermined number of unsuccessful trials, the transmitting level of the terminal is increased to a next level.

18. A method according to claim 1, wherein a newly connected terminal which has detected a valid station key word, is switched on and is using a ranging window, performs the additional steps of:

detecting a signal delay time on the optical transmission line from the time between the transmitting of the station key word and the receiving of the station key word; and setting a time delay for its own transmitter based upon the detected signal delay time.

19. A method according to claim 18, wherein upon detecting a valid station key word received from the central unit the terminal performs the following steps:

detecting a free time slot; and seizing the detected time slot by feeding into the time slot in the transmitting direction towards the central unit a bit pattern, identifying the time slot as being assigned.

20. A method according to claim 18, wherein the packet section is cleared by the central unit at regular intervals to form a ranging window.

21. In an optical transmission network having a number of terminals and a central unit connected by optical fibres and at least one beam splitter connected in a tree-like structure, wherein each terminal is equipped with a transmitter and a receiver, each connected to an optical fibre of the network, for optical binary signals and the transmitting level of the terminals being adjustable, the improvement comprising:

each of said terminals including, a generator for creating a station key word to be sent to the central unit during a configuration operation, said generator having an input and an output, a comparator having a first input connected to an output of said receiver and a second input connected to the output of the generator, said comparator for comparing the station key word which has been retransmitted by the central unit and the station key word generated by the generator and for providing an output corresponding to the results of the comparison, a logic circuit having an input connected to the output of the comparator, said logic circuit upon receiving an indication of an invalid station key word providing an output to the generator for causing the generator to generate another station key word, switch means responsive to an output from the logic circuit for connecting the output of the generator to the transmitter, and a time measuring means connected between the receiver and the transmitter for measuring the time delay between the transmission of a station key word and the receiving of the station key word retransmitted from the central unit, said time measuring means having an output connected to the transmitter for adjusting a time delay in the transmitter.

22. An optical transmission network as described in claim 21, where the terminal additionally comprises:

a delay means disposed between the output of the logic circuit and the generator for adjusting time intervals between successive transmissions of the station key word.

23. A transmission network as described in claim 22, wherein said delay device contains a random generator for randomly generating time delays.

* * * * *